Patented Dec. 31, 1935

2,025,762

UNITED STATES PATENT OFFICE 2,025,762

CERAMIC PRODUCTS COMPOSED MAINLY OF SILICA, MAGNESIA, AND ALKALIES

Andrew Malinovszky, South Gate, Calif., assignor, by mesne assignments, to Malinite Corporation, Los Angeles, Calif., a corporation of California No Drawing. Application October 3, 1932, Serial No. 636,029

6 Claims. (Cl. 106—11)

This invention relates to ceramic bodies which are characterized by a high degree of strength, resistance to rapid temperature changes, resistance to abrasion, relatively low permeability and absorption and to a method whereby bright colors may be developed throughout the body. Furthermore, the invention is directed toward the production of ceramic bodies having the hereinabove described characteristics, in a rapid and economical manner.

Although numerous articles may be made in accordance with this invention, the description given hereinafter will be particularly directed toward the manufacture of vitrified floor tile as all of the characteristics mentioned must be developed to a high extent in this type of product in order to insure the suitability of the product.

Heretofore vitrified ceramic bodies have been made from silica, clay and feldspar. The manufacture of such vitrified clay bodies in precise sizes and shapes has been difficult of accomplishment in view of the large linear and volumetric changes which occur during the burning operations. Furthermore vitrified ceramic bodies made from silica, clay and feldspar are limited in color to a range of reds and browns. It has been impossible heretofore to manufacture vitrified bodies in the brilliant shades of blue, green, orchid, pink, etc., and to have such color extend throughout the body of the tile. As a matter of fact, it has been impossible heretofore to even produce durable glazes on clay bodies in several of the colors mentioned. In addition, the prior methods and proportions of ingredients used in producing substantially vitrified bodies have required the use of high temperatures for prolonged periods of time, thereby materially increasing the cost of the product.

It has been discovered that by maintaining silica, alumina, alkaline earths and alkali, entering into the composition of a ceramic body, within certain definite molecular ratios it is possible to produce substantially vitrified ceramic bodies at relatively low temperatures, these bodies exhibiting practically negligible volumetric and linear changes during drying and burning and giving rise to high crushing and breaking strengths, low permeability and absorption, and high resistance to abrasion or wear.

It has also been discovered that by maintaining the elements specified hereinabove within definite limits of molecular ratios, it is possible to add small quantities of pigments such as metallic oxides, to the bodies and develop deep and brilliant colors throughout the burned, substantially vitrified product.

It is an object of this invention, therefore, to disclose and provide ingredients and proportions whereby substantially vitrified ceramic products may be readily and economically produced.

Another object of this invention is to disclose and provide a ceramic body containing elements and ingredients in a predetermined molecular ratio and a pigmenting metallic oxide distributed therethrough, whereby a brilliant color is imparted to the body.

A further object is to disclose and provide a particular relationship between the silica, alumina, alkaline earths and alkali present in a ceramic body whereby substantially vitrified ceramic products of desirable characteristics may be readily obtained.

These and other objects, uses and advantages of this invention will become apparent to those skilled in the art from the following detailed description of the ingredients and proportions to be employed in applying the teachings of this invention. In order to facilitate the understanding of this invention, the detailed description given hereinafter will be limited to the manufacture of substantially vitrified floor tile, it being understood that numerous other ceramic products, suitably burned for other purposes may be made in substantially the same manner.

As has been mentioned hereinabove, it is impossible to manufacture vitrified products in accordance with the teachings of the prior art which would have a brilliant color such as blue or green throughout the body. This is partly due to the fact that all clays are somewhat impure but even though silica, pure kaolin and feldspar are used, the development of brilliant colors throughout the body still remains an impossibility. Addition of chromium oxide, for example, to the mixture of ingredients normally employed in the manufacture of vitrified tile will not produce a bright green coloration throughout the body but instead give rise to a drab and muddy olive brown. This drab and uninteresting coloration is obtained even though excessively large quantities of chromium oxide are added to the mix. Variations in burning temperatures do not develop the bright green color. If, however, the ingredients entering into the mix are so proportioned as to come within the teachings of this invention, then the addition of a relatively small amount of chromium oxide will permit the development of a substantially vitrified, matured body of fine texture, high strength, low permeability and high resistance to wear, together with the development of a bright green coloration throughout the body, thus giving rise to a new product having numerous decorative and utilitarian uses in the structural arts.

Generally stated, it has been found that the molecular ratio betwen alkalies, alkaline earths and alumina plays the most important part in the development of the desired results. For example, it has been found that less than 3 parts of $Al_2O_3$ to each part of $Na_2O$ and $K_2O$ should be present in the final burned body. The presence of more alumina than is indicated in this ratio will prevent the development of bright colors from the various metallic oxides or other pigments added to the mixture. Moreover, it has been found that the ceramic body should contain a relatively high proportion of the alkaline earths, particularly magnesia; preferably from between 0.6 and 8.0 parts of CaO and MgO should be present for each part of $Na_2O$. Again it has been found that the proportion of silica present in the body plays an important part in the development of the desired characteristics and that desirable results are attained when from about 3 to 14 parts of $SiO_2$ are present for each part of $Na_2O$. It is to be understood that whenever reference is made herein to alkalies or whenever the molecular ratios are expressed in their relation to $Na_2O$, reference is made to both sodium and potassium and their total content in the burned or dehydrated body. In view of the fact that potassium is preferably present in only small quantities and the major alkali content is represented by sodium, the ratios and discussion given hereinafter will only refer to the sodium content.

The above molecular ratios represent the maximum limitations. The preferred range of ratios is as follows:

| | |
|---|---|
| $Na_2O$ | 1.0 |
| CaO and MgO | 1.0 to 4.0 |
| $Al_2O_3$ | 0.1 to 2.0 |
| $SiO_2$ | 4.0 to 12.0 |

Attention is called to the fact that the preferred ceramic bodies consist essentially of silica and the alkaline earths with a relatively small proportion of alumina and a relatively high proportion of alkali. Bodies coming within the above molecular ratios are capable of being burned to maturity or substantial vitrification at relatively low temperatures, that is, at temperatures of from about 1500° F. to 2000° F. or at below cone 1. It is to be understood that in addition to the alkalies, alkaline earths, silica and alumina mentioned hereinabove, the ceramic body may contain very small amounts of other components such as iron, lead, zinc, barium, etc. The various components may be derived from well known ceramic materials. Any of the magnesia-bearing minerals may be used, such as, for example, dolomite, magnesite, tremolite, serpentine, enstatite, etc. Furthermore, any material high in sodium or high in sodium and calcium silicates, whether such material is natural or artificial and in raw or prefused form, may also be used. Fused sodium silicate, for example, has been found to be a very desirable and efficient source of alkali. Nephelite, sodalite, syenite and phonolite may be cited as sources of alkaline substances. In the manufacture of some of the dark colored vitrified bodies, the silicates present in cement and other slags may be used although this source is not considered desirable. Obviously, any of the magnesia or sodium-bearing minerals or substances may be blended together in the production of a ceramic mix whose elements come within the molecular ratios embraced by this invention.

In making up the mixtures, the various ingredients are finely ground, that is, to 40 mesh and finer, and preferably to about 100 mesh. The texture of the resulting product may be somewhat influenced by the degree of fineness to which the ingredients are ground before molding, pressing, or otherwise forming the mixture into bodies.

Various pigments are then added to the ground and mixed ingredients. The metallic oxides such as the oxides of chromium, cobalt, manganese, copper, uranium and iron have been found to produce highly desirable colors throughout the bodies. Chromium will impart a green coloration, cobalt and copper will product blues of different shades, uranium will produce a yellow color, iron oxide will form a pink coloration and manganese oxide will produce a flesh pink or orchid. Various other shades may be produced by selectively mixing the various oxides. Particular attention is called to the effects which may be obtained by the use of copper, cobalt and chromium, the copper giving rise to a brilliant robin's egg blue which heretofore has never been obtained in ceramic products.

The various oxides may be added to the ceramic ingredients in suitable amounts, the quantities generally ranging from about 0.5 to 4.0 per cent by weight of the total mixture. Obviously, the density of the color produced is influenced by the amount of the pigment added to the mixture. Substantially white bodies may be obtained without the addition of pigments. The mixture of pigment and ceramic materials is preferably moistened with water or some aqueous solution such as a solution of lignin extract or sodium alginate and the bodies then molded, pressed or otherwise formed therefrom.

These formed bodies are then subjected to heat sufficient to mature or suitably vitrify the bodies. It may be here mentioned that bodies coming within the molecular ratios herein disclosed are capable of being subjected to a very rapid burning operation without shattering or distortion. When a prefused material is used as the source of alkali, the bodies may be brought up to maturing temperature in a period of three to six hours and will be found to have completely vitrified by being maintained at the maturing temperature for a period of time of about two hours.

A composition coming within the molecular ratios given hereinabove may be made from talc, kaolinite and sodalite. The approximate analyses of these ingredients on a dehydrated basis were as follows:

| | Sodalite | Talc | Kaolinite |
|---|---|---|---|
| $SiO_2$ | 39.4 | 66.7 | 54.06 |
| $Al_2O_3$ | 33.5 | | 45.94 |
| MgO | | 33.30 | |
| $Na_2O$ | 27.1 | | |

It is to be noted that the sodalite originally contained about 7 per cent chlorine but the above analysis is recalculated to 100 per cent without chlorine as the chlorine is driven off before the ceramic body matures.

The above ingredients were compounded in the proportion of 49 per cent of talc, 6 per cent of kaolinite and 45 per cent of sodalite. This proportion of ingredients gave rise to a composition containing 1.33 parts of MgO, 1.46 parts of $Al_2O_3$, and 4.39 parts of $SiO_2$, to 1 part of $Na_2O$. This body was capable of developing brilliant colors by the addition of various metallic oxides and readily burned to vitrification at temperatures of about 1850° F. Attention is called to the fact that no substantial amount of lime is present in the above composition and that magnesia is the preferred alkaline earth; lime, if present, occurs in these compositions in minor proportions only, principally as an impurity.

Those skilled in the art will observe that the description given hereinabove provides a novel and accurate method whereby vitrified tile, or other bodies, colored throughout, may be manufactured. It is desired to again emphasize the necessity of maintaining a low alumina ratio in the ceramic mix and the necessity of having magnesia present to some extent therein.

The relatively high proportion of alkalies in comparison with alumina appears to be an essential condition to the development of brilliant colors within the body. The silica content may vary over a considerable range, as stated hereinabove, and does not appear to affect the colors to as great an extent as the other components of the mixture. Although a certain amount of variation will always take place due to variation in the character and purity of the raw materials employed, the preferred range stated hereinabove will always give rise to highly desirable results.

Although specific raw materials have been mentioned hereinabove, it is to be understood that any substance containing the ingredients stated may be used, provided such ingredients are present in the finished composition in the molecular proportions hereinabove expressed.

All such changes and modifications as come within the scope of the appended claims are embraced thereby.

I claim:
1. A ceramic composition containing silica and magnesia in major proportions and but a minor proportion of alumina, said composition containing between 4 and 14 parts of $SiO_2$, between 0.1 and 3 parts of $Al_2O_3$, and between 0.6 and 8 parts of MgO to 1 part of $Na_2O$, on a dehydrated molecular basis.

2. A composition containing $SiO_2$, $Al_2O_3$, MgO and $Na_2O$ in the ratios expressed in claim 1, and containing in addition an added pigmenting metallic oxide from the group consisting of cobalt, chromium, copper, uranium, manganese and iron oxides.

3. A ceramic composition containing silica and magnesia in major proportions and but a minor proportion of alumina, said composition containing between 4 and 12 parts of $SiO_2$, between 0.1 and 2 parts of $Al_2O_3$, and between 0.6 and 5 parts of MgO to 1 part of $Na_2O$, on a dehydrated molecular basis.

4. A composition of the character defined in claim 3 and containing an added pigmenting metallic oxide from the group consisting of cobalt, chromium, copper, uranium, manganese and iron oxides.

5. A ceramic composition containing silica and magnesia in major proportions and but a minor proportion of alumina, said composition consisting essentially of silica, magnesia, alumina and alkalies, said composition containing between 4 and 14 parts of $SiO_2$, between 0.1 and 3 parts of $Al_2O_3$, and between 0.8 and 5 parts of MgO to 1 part of $Na_2O$ on a dehydrated molecular basis.

6. A ceramic composition containing silica and magnesia in major proportions and but a minor proportion of alumina, said composition consisting essentially of silica, magnesia, alumina and alkalies, said composition containing between 4 and 14 parts of $SiO_2$, between 0.1 and 2 parts of $Al_2O_3$, and between 0.6 and 5 parts of MgO to 1 part of $Na_2O$ on a dehydrated molecular basis.

ANDREW MALINOVSZKY.